Jan. 13, 1959

C. G. MILBOURNE 2,868,632

METHOD FOR THE CATALYTIC CONVERSION OF HYDROCARBONS

Filed March 3, 1955

Inventor:
Charles G. Milbourne
by Howson & Howson
Attys.

United States Patent Office
2,868,632
Patented Jan. 13, 1959

2,868,632

METHOD FOR THE CATALYTIC CONVERSION OF HYDROCARBONS

Charles Gordon Milbourne, Lansdowne, Pa., assignor, by mesne assignments, to The United Gas Improvement Company, Philadelphia, Pa., a corporation of Pennsylvania Application March 3, 1955, Serial No. 491,985

5 Claims. (Cl. 48—214)

The present invention relates to a cyclic catalytic process involving hydrocarbons, such as the reforming or cracking of hydrocarbons, into a combustible gas. More particularly, it relates to improved apparatus and method for carrying out such catalytic reactions in a cyclic manner without encountering substantial thermal cracking of the hydrocarbon reactant.

In past years, the cracking of hydrocarbons into combustible gas has been accomplished, for the most part, by passing the hydrocarbon, in a gaseous state, through a coke fire preferably in the presence of steam. In this way, thermal cracking occurs with the formation of hydrogen and carbon. Little or none of the carbon content of the hydrocarbon, however, is converted directly to carbon monoxide, although some of the deposited carbon may be converted to carbon monoxide and hydrogen by reaction with the steam. Generally, however, the carbon which is deposited in the fuel bed is consumed during blasting of the coke bed. Thermal cracking of hydrocarbons has also been accomplished by passing the hydrocarbons in the gaseous state, with steam as a diluent, through heated, non-catalytic refractory material.

It is known that gaseous hydrocarbons can be reacted with steam to liberate hydrogen and at the same time form carbon monoxide by union of the carbon of the hydrocarbon with the oxygen of the steam, and liberation of additional hydrogen from the steam. For example, catalysts have been employed to permit this "reforming" to take place at a temperature below that at which thermal cracking occurs, in an attempt to avoid the production of carbon. The equipment used in the past has been very costly, consisting mainly of high alloy metal tubes filled with the catalyst and heated externally in a furnace. The hydrocarbon and steam reactants are passed continuously through the tubes. One of the main difficulties of such a procedure is the provision of sufficient heat within the catalyst mass in order to maintain the high endothermic reaction. The temperature of the catalyst is maintained by conduction of the heat from the furnace through the tubes. The conductivity of the catalyst material in discrete particle form is not high so that metal tubes must operate at a temperature not very far below the maximum safe temperature of the most resistant metal alloy tubes. Furthermore, since the conduction from particle to particle of the catalyst is poor, the temperature of the catalyst next to the tube wall is higher than at the center resulting in a non-uniform temperature across the tube.

Because of these difficulties, inherent in a continuous, externally heated system, there have been developed certain cyclic procedures wherein the catalyst mass is heated internally from time to time. Such cyclic procedures generally involve the use of a confined path lined with heat storage refractory material and comprising a stationary catalyst zone. Periodically, hot gases, comprising hot combustion products, are passed through the path and through the catalyst zone storing heat in the refractory lining and catalyst zone. The catalyst zone is normally supported on arches also made of refractory material, and often refractory bricks arranged in familiar checkerwork pattern are provided below the catalyst zone to serve as pre-heating means or as part of the support for the catalyst zone. Such arches and checkerwork, if employed, also become highly heated by the hot gases passing in contact therewith, and since they are upstream from the catalyst zone in the gas flow path, they generally become hotter than the catalyst zone. Following the heating step, the hydrocarbon reactant is admitted to the path, absorbing heat from the refractory material therein and passing through the catalyst zone where reforming or cracking takes place. Following this gas-making period and before the temperatures have fallen to below those necessary for the reaction, the path is again heated as described. Recent substantial improvements in cyclic catalytic reforming are disclosed and claimed in co-pending applications of John Hawley Taussig, Jr., Serial No. 124,648, now Patent Number 2,665,979, of Price W. Janeway, Jr., Serial No. 180,971, now U. S. Patent 2,743,171, and of John S. Haug, Serial Nos. 181,002, now abandoned, and 181,003, now U. S. Patent 2,720,450. More recently there has been developed a process whereby the above-described cyclic principle is employed in the catalytic reforming of normally liquid petroleum hydrocarbons into a combustible gas rich in oil gas and having heating values ranging from about 700 B. t. u. to about 1200 B. t. u. per cubic foot ($N_2$ free basis). This process is disclosed and claimed in co-pending application of Clarence B. Glover and Charles G. Milbourne, Serial No. 426,776, filed April 30, 1954, now Patent No. 2,828,196. The present invention is applicable to the procedures and apparatus disclosed therein as well as to other catalytic reforming and cracking procedures and apparatus.

In the above-described cyclic procedures, the hydrocarbon reactant, before passing through the catalyst zone, comes into contact with the stated refractory surfaces. By virtue of the method of heating, that is cyclically and by direct contact with hot gases, the exposed surfaces of the refractory material possess very high temperatures, particularly at the beginning of the gas-making portion of the cycle. Contact of the hydrocarbon with these hot surfaces has been found to result in thermal cracking of a significant proportion of the hydrocarbon into hydrogen and free carbon. This is particularly true where the hydrocarbon is a liquid hydrocarbon, especially a heavier liquid hydrocarbon. This free carbon not only results in a reduction in the yield of desired gases, but serves as a contaminant, giving rise to the danger of fouling the catalyst surface and clogging the interstices in the catalyst bed, and in the checkerwork bed if employed.

It is a principal object of the present invention to provide an improved apparatus and method for the cyclic catalytic conversion of hydrocarbons into a combustible gas whereby thermal cracking of the hydrocarbon reactant prior to its contact with the catalyst zone is substantially reduced or eliminated.

Another object of the present invention is to provide an improved apparatus and method wherein the above-stated advantageous results are obtained without, however, requiring costly alteration of either apparatus or operating procedure from present installations and practices.

Other objects will become apparent from a consideration of the following specification and claims.

It has been found that the provision of a small amount of a metal selected from the group consisting of nickel and cobalt on the exposed surfaces of the heat storage refractory material, prevents thermal cracking of the hydrocarbon coming into contact therewith in spite of the fact that the temperature of such heat storage refractory material may be above the thermal cracking temperature of the hydrocarbon. In this connection nickel is the preferred metal and the employment of such metal as described herein represents the preferred embodiment of the invention.

With respect to the improved apparatus of the present invention, it comprises an enclosed path lined with heat storage refractory material and comprising a zone of hydrocarbon reforming catalyst, and valved conduits connected to said path for leading hydrocarbon reactant, and steam when employed, thereinto, the exposed surfaces of said refractory heat storage material between the connection of said valved hydrocarbon reactant conduit and the catalyst zone having, in accordance with the present invention, a coating thereon of a metal selected from the group consisting of nickel and cobalt.

With respect to the improved process, it comprises, in the cyclic catalytic conversion of a hydrocarbon into a combustible gas by the alternate internal heating of an enclosed or confined path lined with heat storage refractory material and comprising a zone of the said catalyst, and admission of hydrocarbon to said path whereby said hydrocarbon absorbs heat from said heat storage refractory material and then passes through the catalyst zone wherein conversion takes place, the improvement of preventing, during the gas-making step of the cycle, thermal cracking of the hydocarbon during contact with said heat storage refractory material during passage through said path and before contact with said catalyst zone which comprises maintaining a film of a metal selected from the group consisting of nickel and cobalt on substantially all of the exposed surface with which the hydrocarbon comes into contact during passing through said path prior to contact with said catalyst zone. In other words, the novel process of the present invention comprises pre-heating the hydrocarbon reactant in the enclosed path and prior to its passage into the catalyst zone by contact with and radiation from the refractory heat storage material of the lining, and of any other structure interposed in the path as more fully discussed hereinafter, substantially all of the exposed surfaces of the stated refractory heat storage material traversed by the hydrocarbon during its passage through the path and before passage into the catalyst zone having the stated film thereon. The term "conversion" as used herein refers to mere catalytic cracking of a hydrocarbon into smaller gaseous hydrocarbons and hydrogen wherein steam, if used, serves primarily as a diluent, as well as to catalytic reforming wherein reaction between the hydrocarbon and steam takes place producing hydrogen and oxides of carbon, mainly carbon monoxide.

The operation of the process and the apparatus will be more clearly understood from a consideration of the drawings in which.

Figure 1:
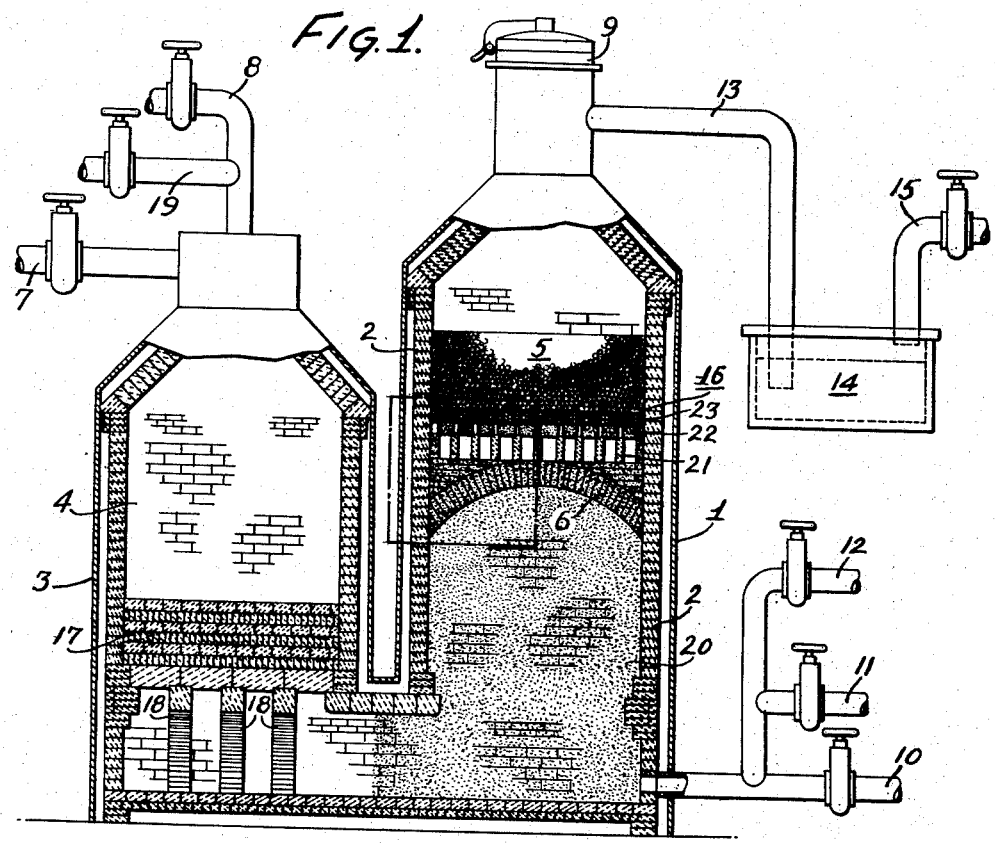
Figure 1 shows, partly in section, the preferred form of the apparatus of the present invention.

In Figure 1, 1 represents a chamber, lined with refractory material 2, serving as the stated confined path. Chamber 1 may be, for example, the superheater of a conventional water gas set with appropriate modification as is obvious from the drawing. 3 represents a refractory lined chamber containing combustion chamber 4 wherein fluid fuel is burned to provide hot gases for internally heating the path.

The catalyst bed is represented by 5 and may be supported on heat storage bed 16, as shown, or on firebrick arches 6. To prevent the catalyst bodies from falling down through the checkerwork or arches, the catalyst mass may rest directly on a heavy metal screen or perforated refractory layer 23 (not shown in Figure 1 but shown in detail in Figures 2 and 3). Numerals 7 and 8 represent, respectively, the air and fluid fuel supply means for combustion to provide hot gases for heating the apparatus, and 9 represents the stack valve through which the waste heating gases may be discharged to the atmosphere, or to a waste boiler (not shown), before being discharged to the atmosphere. The conduit for the hydrocarbon reactant for introduction into the chamber is represented by 10, the conduit for process steam at 11 and for process air at 12. 13 represents the conduit through which gas leaves the reaction chamber, passing through wash box 14 to storage by valved conduit 15. In accordance with known gas practice, the gases leaving the reaction chamber for storage may pass through a waste heat boiler (not shown) before reaching the wash box. The flow of the respective materials into and from the set through the described conduit means is controlled by suitable valves as shown.

A primary heat storage bed 17 for pre-heating a portion or all of the reactants other than the hydrocarbon may be, and preferably is, provided as shown in the drawing. Heat storage zone 17 consists of heat accumulating refractory bodies such as firebrick arranged in familiar checkerwork pattern, as shown, or randomly arranged pieces of refractory material, or a combination of both. The heat storage material may be supported as by firebrick arches 18. Second heat storage zone 16, supported as by arches 6, may be provided as discussed above, and this may be constructed as described in connection with heat storage zone 17. It will be realized that the heat storage zones need not be single units, but each may be made up of two or more separate beds.

Where a primary heat storage zone is employed, a portion or all of the process steam may be introduced prior thereto as through conduit 19. As stated previously, air may also be employed with the hydrocarbon reactant and steam, and this may be admitted in whole or in part, during the gas-making run, through connection 7, or through connection 12. Usually, it will be found advantageous to introduce at least part of the process steam or air, or both, to the combustion chamber as through conduits 19 and/or 7 to prevent excessive accumulation of heat at that point. The provision of a heat storage bed between the combustion zone and entrance for the hydrocarbon reactant, as shown in the drawing, represents the preferred embodiment of the present invention. This feature insures the maintenance of the requisite high temperatures adjacent the combustion zone for rapid ignition and uniform combustion of the fluid fuel during the heating step of the cycle.

20 represents a film of nickel and/or cobalt on the exposed surfaces of the refractory heat storage material that the hydrocarbon reactant contacts from the time it is admitted to the chamber until it passes through the catalyst bed. As shown in the drawing, the film of nickel or cobalt is provided on the exposed surfaces of the refractory lining between the hydrocarbon reactant entrance conduit 10 and the catalyst bed 5, and of the arches 6 supporting the catalyst bed, and, when additional checkerwork such as 16 is employed, the exposed surfaces of such checkerwork also are provided with the film. Figure 1 shows in a general way the exposed surfaces which are to be provided with the nickel and/or cobalt film 20.

Figure 2:
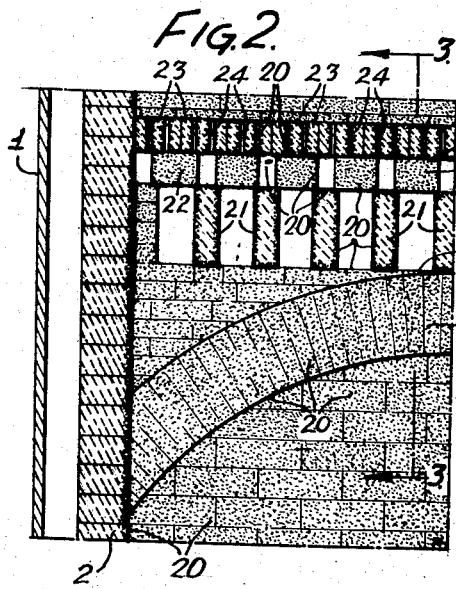
Figure 2 is a fragmentary sectional view of the apparatus shown in Figure 1.
Figure 3:
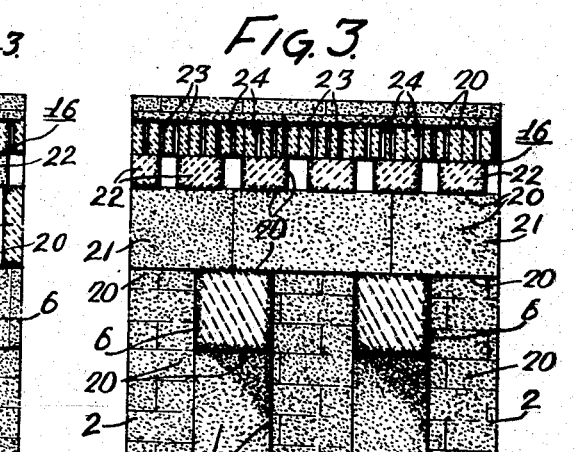
Figure 3 shows a section of Figure 2 taken at line 3—3.

Figures 2 and 3 show in more detail the surfaces on which the nickel and/or cobalt film is to be provided. Figure 2, which represents a portion of the arch work and support means for the catalyst bed shown in Figure 1, and Figure 3, which represents an end view of the arch work and supporting means shown in Figure 2, show that the exposed surfaces of the refractory lining 2 are provided with the film 20. Likewise, the exposed surfaces of the arches 6, including the side faces, the bottom face, and those portions of the top face not covered by refractory brick or tile, are provided with the film. Laid across the arches may be usual refractory tile 21, and the exposed surfaces thereof will be provided with the stated film. The catalyst bed may rest directly on arches 6 or on tiles 21, suitable means being provided to prevent the catalytic bodies from falling down through the arch-work. However, preferably there is interposed between the tiles and the catalyst bed one or more layers of refractory brick 22 arranged in familiar checkerwork pattern. The exposed surfaces of such checkerbrick, if employed, will likewise be provided with the film. As stated above, the catalyst mass may rest on a heavy screen or on perforated brick, such as 23, provided with holes 24 through which the gases may pass. The exposed surfaces of such perforated brick, if used, will also be provided with the stated nickel and/or cobalt film 20.

The metal film may be provided by applying to the stated surface an aqueous solution of a salt of said metal, removing water, decomposing the salt to the oxide and reducing the oxide to the elemental metal. The solution may be applied as by spraying, brushing, or the like. During application the solution saturates the surface and sinks into the relatively porous refractory material. However, upon drying there will be some tendency for the solution to migrate toward the surface. The final result is the provision of a relatively uniform deposit of finely-divided metal on the surface of the refractory material.

In preparing the salt solution any water soluble nickel or cobalt compound which can be decomposed by heat to the oxide may be employed, such as a nitrate, acetate, or the like. In connection with the nickel salts a particularly advantageous salt is nickelous nitrate,

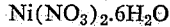

$Ni(NO_3)_2 \cdot 6H_2O$

In making up the solution, the concentration of the salt therein may vary widely although it is preferred to employ a relatively concentrated solution, for example, a saturated solution. Heat may be employed to insure solution. In this connection a particularly advantageous solution is prepared by agitating a mixture consisting of 11.25 pounds of nickelous nitrate, $Ni(NO_3)_2 \cdot 6H_2O$, per gallon of water at 150° F. until the crystals are completely dissolved. When the solution of nickelous nitrate described above is sprayed at 150° F. onto refractory material so as to saturate the surface and dried and reduced as described, a deposit of about 4 to 6% nickel, by weight, based on the outer 1/32 of an inch of surface is provided on the surface. The amount of metal deposited on the surface may vary from the above-stated amounts, and may be as low as about 2%, by weight, based on the outer 1/32 inch of surface. Amounts above about 8% on the same basis generally do not provide corresponding increases in effectiveness and hence will generally not be employed. The metal may of course penetrate to an extent greater than 1/32 of an inch, however, since the effect is primarily a surface effect, only the outer 1/32 inch need be reckoned with.

Following the application of the solution to the refractory material, the wet refractory material is dried to remove the water and to deposit the salt in solid form. This may advantageously be accomplished by the aid of heat, such as by passing hot gases in contact with the treated surface. For drying purposes, temperatures somewhat above 212° F. are desirable. The resulting deposited salt is then converted to metallic form. The salt is first converted to its oxide before reduction to the elemental state. In the case of the preferred nickelous nitrate mentioned above, the salt, following drying at 225° F. to 300° F. for one hour by means of hot air and/or combustion products, may be converted to the oxide by heating to 750° F. for thirty minutes. Conveniently, the conversion of the salt to the oxide, and, in fact, both drying and conversion to the oxide, can take place during one heating operation, such as during the normal starting up of the unit where temperatures above 750° F. are employed. The reduction of the oxide may be accomplished by known means such as the application of heat in conjunction with a reducing gas, for example, a gas containing hydrogen or carbon monoxide.

The operation of the apparatus and process is, as stated, cyclic, and the procedure comprises first a heating period during which air and a fluid fuel are admitted through connections 7 and 8, respectively, combustion taking place in combustion chamber 4. The hot combustion gases are passed through the confined, refractory-lined path 1, storing heat in the lining and through the catalyst bed and its supporting arches, storing heat therein, and may then be discharged through stack valve 9. When a checkerwork structure is employed just below the catalyst bed, such as bed 16, the hot gases, of course, will also pass therethrough. Likewise, when a primary heat storage bed, such as 17, is employed, the hot gases will also pass through thus storing heat therein.

After the set is at operating temperature, stack valve 9 is closed, and air and fuel connections 7 and 8 are also closed. Connections 10 and 11 and/or 19 are opened to admit, respectively, the hydrocarbon reactant and process steam. If desired, process air may be admitted as by opening connections 7 and/or 12. The hydrocarbon reactant, through contact with the hot refractory material of the lining and arches supporting the catalyst bed, and in any checkerwork between the catalyst bed and its supporting arches, and through radiation from these heated materials and contact with the preheated steam and air, when used, becomes heated substantially to reaction temperature. However, because of the deposit of nickel and/or cobalt on these exposed surfaces, no substantial thermal cracking of the hydrocarbon into hydrogen and carbon will take place in spite of the high surface temperatures of these exposed surfaces. Some premature catalytic reforming may take place, but this, of course, is not undesirable. The process steam, and process air if used, become heated in the same manner, and, in addition, when admitted to the combustion chamber, a primary heat storage bed such as 17 being provided, become preheated by their flow through the primary heat storage bed and its supporting arches and by contact with and radiation from the lining of refractory material, catalyst bed-supporting arches and any other heat storage material interposed in the path. As stated, such heat storage beds, such as heat storage bed 16 and heat storage bed 17, are preferably interposed in the path. In the event such heat storage beds are employed, a portion or all of the steam and/or air, if used, may be introduced to the system between the heat storage beds, in which case heat storage bed 16 plus the refractory lining and the arches supporting the catalyst bed, may be relied upon to supply the necessary heat to those materials not passed through primary heat storage bed 17. In any event, all the reactants absorb heat and become preheated substantially to reaction temperature before they pass through the catalyst bed.

In passing through catalyst bed 5, the reaction gases become converted into a fixed gas comprising hydrogen and oxides of carbon, mainly carbon monoxide, and varying amounts of gaseous hydrocarbons depending upon the degree of conversion desired. On the other hand, where it is desired partially to reform a higher hydrocarbon into a high B. t. u. gas rich in oil gas in accordance with the process disclosed and claimed in above-mentioned copending application Serial No. 426,776 of Clarence B. Glover and Charles G. Milbourne, higher amounts of short chain gaseous hydrocarbons will be produced.

While the drawing in Figure 1 illustrates two chambers, it will be understood that a one- or three-shell set may be employed following the same general principles described above. For instance, chamber 3 may be omitted, the bottom of chamber 1 serving as the combustion space. In this case, a primary heat storage bed may be interposed above the combustion space, the hydrocarbon reactant being introduced above the primary heat storage bed. As in the case with the apparatus shown in the drawing, a portion or all of the process steam and/or air, if employed, may be admitted to the combustion chamber at the bottom of chamber 1. Similarly, in a three-shell arrangement, employing also, for example, the generator of a conventional carburetted water gas set, the generator may serve as combustion chamber, and the fuel and air, and also some or all of the process steam, and process air if used, can be admitted to the generator, flowing to the carburetor top by way of an open conduit connecting the tops of the generator and carburetor, thence to the superheater as described. The present invention may be applied to such arrangements by providing the deposit of nickel and/or cobalt on the exposed refractory surfaces with which the hydrocarbon comes in contact during the passage through the system and prior to its passage through the catalyst bed. It is apparent, in view of the nature of the invention, that it is applicable to a wide variety of systems, apparatus and procedures wherein a refractory-lined path containing a catalyst zone or zones, is cyclically heated internally and wherein hydrocarbon reactant becomes exposed in the path to surfaces at high temperatures before reaching the catalyst zone or zones including, as stated, those systems disclosed in the stated Taussig patent and in the stated copending applications.

It will be realized that in accordance with common gas-making practice steam purges may be, and preferably are, made between the heating and the reforming portions of the cycle, or between the reforming and heating portions of the cycle, or both. These purges, as known to those familiar with the gas-making art, serve to clear the system of undesirable gases which may contaminate the generated gas or serve to force residual desirable gases to storage.

With respect to catalyst bed 5, catalysts for the conversion of hydrocarbons to produce combustible gas mixtures comprising free hydrogen, normally gaseous hydrocarbons, carbon monoxide, and the like, are well known. The catalysts most frequently proposed for this purpose are metals of the iron group, with nickel and cobalt catalysts usually preferred, although other high melting metals such as vanadium, chromium, platinum, and the like have been used. As between nickel and cobalt, the nickel catalysts have usually been used because the reaction is easier to control and the nickel catalysts are less expensive. A suitable refractory carrier is frequently employed, on the surface of which the catalytic material is disposed or throughout which it is distributed. Difficultly reducible oxides such as alumina, silica, magnesia, calcium oxide, titanium oxide, chromium oxide, oxides of rare earth metals such as, for example, thoria, ceria, and/or others may be present. Compounds such as chromates may be employed.

The hydrocarbon material treated in the gas-generating portion of the cycle may range from normally gaseous hydrocarbon material such, for example, as methane, ethane, propane, or butane up to heavy hydrocarbon oils. Corresponding unsaturated hydrocarbons may be present in any desired concentration, such, for example, as ethylene, propylene, butylene, etc. When normally liquid hydrocarbons are employed, appropriate vaporizing means will be relied upon to convert the hydrocarbon to the gaseous state. Natural gas, which is primarily methane and refinery oil gas, which is primarily methane and ethylene are among the hydrocarbon materials which may be employed. Natural gas, because of its availability is particularly preferred as the hydrocarbon reactant.

Referring to the temperature conditions employed during the cycle, the reactants, as stated, should be heated substantially to reacting temperatures by the time they pass into the catalyst zone. The exact temperature conditions required for this purpose will depend in part upon the particular hydrocarbon reactant employed. It has been found, for example, that when reforming natural gas, the average temperature of the refractory lining, the arches supporting the catalyst zone and any checkerwork heat storage material, traversed by the hydrocarbon reactant, need not exceed about 2000° F., nor should it fall below about 1400° F.

When reforming hydrocarbons heavier than methane, it may be desirable to employ somewhat lower temperatures since the reformation of hydrocarbons heavier than methane, may not require temperatures as high as when methane is reformed. Thus, when reforming hydrocarbons heavier than methane, temperatures as low as about 1000° F. may be employed in the preheating areas.

The heat storage portion of the cycle may be conducted by burning the fuel with excess air, with insufficient air to support complete combustion, or with just the amount theoretically required for complete combustion, so long as the heat storage beds and catalyst are raised to the required temperatures. In a preferred embodiment of the process, however, at least the latter part of the heating portion of the cycle is conducted by burning the fuel with insufficient air to support complete combustion, as described in co-pending application of John Hawley Taussig, Jr., Serial No. 124,648, now Patent Number 2,665,979, thereby producing combustion products substantially devoid of free oxygen and having a substantial content of hydrogen and carbon monoxide in addition to their content of carbon dioxide, water vapor, and nitrogen. This insures the maintenance of the catalyst in a highly active state. In this type of operation, it is also advantageous to conduct the first part of the heat storage portion of the cycle by burning fuel in the presence of air in excess of that required for complete combustion. A particularly advantageous means of supplying heat to the catalyst zone involves the controlled use of free oxygen during a portion of the cycle other than the reforming step to oxidize the catalyst metal, particularly in the case where the catalyst comprises nickel, in accordance with the process disclosed and claimed in co-pending application of Harold V. Erickson and Francis W. Hartzel, Serial No. 379,934, filed April 1, 1952. This oxidation generates heat within the catalyst zone. Before the main portion of the reforming step, the oxidized catalyst is reduced to metallic form as by passing products of incomplete combustion or other reducing gases through the catalyst zone, with the simultaneous combustion of the reducing gases.

The process of the present invention will be more readily understood from a consideration of the following specific example which is given for the purpose of illustration only and is not intended to limit the scope of the invention in any way.

*Example*

A nickel salt solution is prepared by dissolving nickelous nitrate, $Ni(NO_3)_2 \cdot 6H_2O$, in water heated to 150° F. in proportions of 11.25 pounds of nickelous nitrate per gallon of water.

The refractory lining and arches of a nickel catalyst zone-containing shell are sprayed with the solution. The catalyst is in the form of cylinders 2 inches in diameter and 2 inches in length. The catalyst zone is 66 inches deep.

Hot gases are then passed through the shell to dry the surfaces and to reduce the salt to metallic nickel.

The shell is then employed cyclically to partially reform diesel oil. Two minute cycles are employed, the reforming portion taking up 40–50% of the cycle.

The resulting gas has a heating value of 1032 B. t. u. ($N_2$ free basis) and 79.5% of the carbon in the diesel oil appears in the gas, 71.1% as gaseous hydrocarbons and 8.4% as carbon monoxide plus hydrogen.

When substantially the same procedure is followed without, however, providing the nickel film on the refractory surfaces with which the oil comes into contact after its admission to the shell and passage through the catalyst zone, only 74.1% of the carbon in the diesel oil appears in the gas, 62.7% as gaseous hydrocarbon and 11.4% as carbon monoxide plus carbon.

Considerable modification is possible in the selection of the hydrocarbon reactant and fuel, as well as in the proportions of reactants, and in the manner of supply-

I claim:

1. In the cyclic catalytic conversion of normally liquid petroleum hydrocarbons into a combustible gas rich in oil gas and having a heating value of at least about 700 B. t. u. per cubic foot ($N_2$ free basis) comprising, in one part of the cycle, internally heating an enclosed path lined with heat storage refractory material and comprising a catalyst zone by passing hot gases therethrough, and, in another part of the cycle, passing a normally liquid petroleum hydrocarbon through said path and through said catalyst zone wherein conversion takes place, the improvement which comprises preheating said hydrocarbon to at least cracking temperature before its passage through the catalyst zone by contact with and radiation from the lining of heat storage refractory material having a film of at least one metal selected from the group consisting of nickel and cobalt on substantially all of the exposed surface thereof.

2. The method of claim 1 wherein steam is employed during the gas-making portion of the cycle.

3. In the cyclic catalytic conversion of normally liquid petroleum hydrocarbons into a combustible gas rich in oil gas and having a heating value of at least about 700 B. t. u. per cubic foot ($N_2$ free basis) comprising, in one part of the cycle, internally heating an enclosed path lined with heat storage refractory material and comprising a catalyst zone supported on arches of heat storage refractory material by passing hot gases through said path, through said arches and through said catalyst zone, and, in another part of the cycle, passing a normally liquid petroleum hydrocarbon through said path and arches and through said catalyst zone wherein conversion takes place, the improvement which comprises preheating said hydrocarbon to at least cracking temperature before its passage through said catalyst zone by contact with and radiation from the lining and arches of refractory heat storage material having a film of at least one metal selected from the group consisting of nickel and cobalt on substantially all of the exposed surface thereof.

4. In the cyclic catalytic conversion of normally liquid petroleum hydrocarbons into a combustible gas rich in oil gas and having a heating value of at least about 700 B. t. u. per cubic foot ($N_2$ free basis) comprising, in one part of the cycle, internally heating an enclosed path lined with refractory heat storage material and comprising a catalyst zone supported on checkerwork and arches of heat storage refractory material by passing hot gases through said path, arches, checkerwork and catalyst zone, and, in another part of the cycle, passing normally liquid petroleum hydrocarbon through said path and through said catalyst zone wherein conversion takes place, the improvement which comprises preheating said hydrocarbon to at least cracking temperature before passage through said catalyst zone by contact with and radiation from the lining, arches and checkerwork of refractory heat storage material having a film of at least one metal selected from the group consisting of nickel and cobalt on substantially all of the exposed surface thereof.

5. The method of claim 4 wherein said film comprises nickel.

References Cited in the file of this patent

UNITED STATES PATENTS

| | | |
|---|---|---|
| 1,738,620 | Umpleby | Dec. 10, 1929 |
| 1,973,851 | Feiler | Sept. 18, 1934 |
| 2,404,574 | Hammond | July 23, 1946 |
| 2,665,979 | Taussig | Jan. 12, 1954 |
| 2,743,171 | Janeway | Apr. 24, 1956 |

FOREIGN PATENTS

| | | |
|---|---|---|
| 1,053,937 | France | Aug. 21, 1951 |